(12) United States Patent
Zilg et al.

(10) Patent No.: US 6,683,122 B1
(45) Date of Patent: Jan. 27, 2004

(54) FILLER MIXTURES

(75) Inventors: Carsten Zilg, Wangen (CH); Rolf Mülhaupt, Freiburg (DE); Jürgen Finter, Freiburg (DE)

(73) Assignee: Vantico A&T US Inc., Los Angeles, CA (US)

( * ) Notice: Subject to any disclaimer, the term of this patent is extended or adjusted under 35 U.S.C. 154(b) by 0 days.

(21) Appl. No.: 10/031,134

(22) PCT Filed: Jul. 6, 2000

(86) PCT No.: PCT/EP00/06424
§ 371 (c)(1),
(2), (4) Date: Jan. 14, 2002

(87) PCT Pub. No.: WO01/04193
PCT Pub. Date: Jan. 18, 2001

(30) Foreign Application Priority Data

Jul. 13, 1999 (CH) .............................................. 1289/99

(51) Int. Cl.⁷ ................................................. C08K 9/04
(52) U.S. Cl. ........................ 523/205; 523/216; 523/466; 524/445; 524/714; 524/789
(58) Field of Search ................................ 523/205, 216, 523/466; 524/445, 714, 789

(56) References Cited

U.S. PATENT DOCUMENTS

| | | |
|---|---|---|
| 3,267,050 A | 8/1966 | Kuryla et al. |
| 4,810,734 A | 3/1989 | Kawasumi et al. |
| 5,554,670 A | 9/1996 | Giannelis et al. |
| 5,747,560 A * | 5/1998 | Christiani .................... 523/209 |

FOREIGN PATENT DOCUMENTS

| | | |
|---|---|---|
| EP | 0265781 B1 | 11/1990 |
| EP | 0581739 B1 | 12/1996 |
| EP | 0512947 B1 | 1/1997 |
| JP | 03 007729 | 1/1991 |
| WO | WO 96 08526 A | 3/1996 |

OTHER PUBLICATIONS

"Ullmanns Encyklopädie Der Technischen Chemie", 4$^{th}$ Edition; vol. 19, Verlag Chemie GmbH, Weinheim 1980, pp. 31–38; pp. 297–299; 304–305.

G.W. Becker and D. Braum, "Kunststoffhandbuch", vol. 7 (Polyurethanes), 2nd Ed., Carl Hanser Verlag, Munich, Vienna (1983), pp. 76–77.

A.D. Wilson and H.J. Prosser, "Developments in Ionic Polymers", London, Applied Science Publishers, Chapter 2, 1986.

* cited by examiner

Primary Examiner—Robert Dawson
Assistant Examiner—D. Aylward
(74) Attorney, Agent, or Firm—Proskauer Rose LLP; Tiffany A. Levato; Kristin H. Neuman

(57) ABSTRACT

A filler mixture comprising an organophilic layer silicate obtainable by treatment of a natural or synthetic layer silicate with a swelling agent selected from sulfonium, phosphonium and ammonium compounds (salts of melamine compounds and cyclic amidine compounds being excluded as ammonium compounds) and a mineral filler different therefrom, yields, in combination with thermosetting resins, nanocomposites having improved mechanical properties.

22 Claims, No Drawings

FILLER MIXTURES

FILLER MIXTURES

The present invention relates to novel filler mixtures, to compositions comprising those filler mixtures and to their use, and to a process for the preparation of nanocomposites.

The preparation of organophilic layer silicates by treatment of layer silicates with onium salts, e.g. quaternary ammonium salts, in the presence of a dispersion medium is known from U.S. Pat. No. 4,810,734. In that treatment an exchange of ions takes place, the cation of the onium salt being inserted into the interlayer space of the layer silicate. Layer silicates modified in that manner become organophilic as a result of the organic radical of the inter-calated amine. When that organic radical contains functional groups, the organophilic layer silicate is capable of forming chemical bonds with suitable monomers or polymers.

WO 96/08526 describes the use of such organophilic layer silicates as filler materials for epoxy resins, there being obtained nanocomposites having improved physical and mechanical properties. It is of special interest that there is an increase in rigidity while the toughness at least remains the same. Especially good properties are exhibited by nanocomposites that contain the layer silicate in exfoliated form. However, the addition of such organophilic layer silicates gives rise not only to an improvement in rigidity but also to a reduction in tensile strength.

It has been found, surprisingly, that a combination of organophilic layer silicates and mineral fillers can yield considerably better mechanical properties than the individual components. In thermosetting resins, the addition of the filler mixtures according to the invention results in a considerable increase in rigidity as compared with the use of pure mineral fillers at the same total filler content, while the substantial reduction in tensile strength which occurs when organophilic layer silicates are used alone is prevented. The filler mixtures according to the invention therefore allow the preparation of filled resins which, while having a relatively low filler content, have good mechanical properties and can be processed without problems. By varying the mixing ratio of mineral filler to organophilic layer silicate it is possible to obtain tailored system-specific property profiles.

The present invention relates to a filler mixture comprising an organophilic layer silicate obtainable by treatment of a natural or synthetic layer silicate with a swelling agent selected from sulfonium, phosphonium and ammonium compounds (salts of melamine compounds and cyclic amidine compounds being excluded as ammonium compounds) and a mineral filler different therefrom.

As layer silicates for the preparation of the organophilic layer silicates of the filler mixtures according to the invention there come into consideration especially natural and synthetic smectite clay minerals, more especially bentonite, vermiculite, halloysite, saponite, beidellite, nontronite, hectorite, sauconite, stevensite and montmorillonite. Montmorillonite and hectorite are preferred.

The layer silicate montmorillonite, for example, corresponds generally to the formula $Al_2[(OH)_2/Si_4O_{10}] \cdot nH_2O$, it being possible for some of the aluminium to have been replaced by magnesium. The composition varies according to the silicate deposit. A preferred composition of the layer silicate corresponds to the formula $$(Al_{3.15}Mg_{0.85})Si_{8.00}O_{20}(OH)_4X_{11.8} \cdot nH_2O,$$

wherein X is an exchangeable cation, generally sodium or potassium, and some of the hydroxyl groups may have been replaced by fluoride ions. By exchanging hydroxyl groups for fluoride ions, synthetic layer silicates are obtained.

The sulfonium, phosphonium and ammonium compounds required as swelling agents for the preparation of the organophilic layer silicates are known and some of them are commercially available. They are generally compounds having an onium ion, for example trimethylammonium, trimethylphosphonium and dimethylsulfonium, and a functional group that is capable of reacting or bonding with a polymeric compound. Suitable ammonium salts can be prepared, for example, by protonation or quaternisation of corresponding aliphatic, cycloaliphatic or aromatic amines, diamines, polyamines or aminated polyethylene or polypropylene glycols (Jeffamine® M series, D series or T series).

Suitable swelling agents are, for example, salts that contain cations of formulae II–IV $$R_1R_2R_3N^\oplus—Z—Y \qquad (II),$$

$$R_1R_2R_3P^\oplus—Z—Y \qquad (III),$$

$$R_1R_2S^\oplus—Z—Y \qquad (IV),$$

wherein $R_1$, $R_2$ and $R_3$ are each independently of the others hydrogen or $C_1$–$C_6$alkyl, Z is the divalent radical of a $C_2$–$C_{30}$alkane that is unsubstituted or substituted by one or more phenyl groups, $C_1$–$C_4$alkoxy groups, hydroxyl groups or halogen atoms and Y is —OH, —COOH, —NH$_2$, vinyl, glycidyl or β-methylglycidyl.

It is preferable to use as swelling agents ammonium salts that are obtainable by reaction of amino acids with mineral acids.

Especially preferred are salts of 4-aminobutyric acid, 6-aminocaproic acid, ω-aminocaprylic acid, 10-aminodecanoic acid, 12-aminododecanoic acid, 14-aminotetradecanoic acid, 16-aminohexadecanoic acid and 18-aminooctadecanoic acid.

Special preference is given to layer silicates in which the layers have a layer spacing of about from 0.7 nm to 1.2 nm and which have a cation exchange capacity in the region of 50 to 200 meq./100 g (milliequivalents per 100 grams). After treatment with the swelling agent (sulfonium, phosphonium or ammonium compound), the layer spacing in the organophilic layer silicates so obtained is preferably at least 1.2 nm. Such layer silicates are described, for example, in A. D. Wilson, H. T. Posser, Developments in Ionic Polymers, London, Applied Science Publishers, Chapter 2, 1986. Synthetic layer silicates can be obtained, for example, by reaction of natural layer silicates with sodium hexafluorosilicate and are commercially available inter alia from the CO-OP Chemical Company, Ltd., Tokyo, Japan.

For the preparation of the organophilic layer silicates, the swelling agent is first advantageously dispersed or dissolved, with stirring, in a dispersion medium, preferably at elevated temperature of about from 40° C. to 90° C. The layer silicate is then added and dispersed, with stirring. The organophilic layer silicate so obtained is filtered off, washed with water and dried.

It is, of course, also possible to prepare the dispersion of the layer silicate as initial batch and then to add the solution or dispersion of the swelling agent.

Suitable dispersion media are water, methanol, ethanol, propanol, isopropanol, ethylene glycol, 1,4-butanediol, glycerol, dimethyl sulfoxide, N,N-dimethylformamide, acetic acid, formic acid, pyridine, aniline, phenol, nitrobenzene, acetonitrile, acetone, 2-butanone, chloroform, carbon disulfide, propylene carbonate, 2-methoxyethanol, diethyl ether, tetrachloromethane and n-hexane. Preferred dispersion media are methanol, ethanol and especially water.

The swelling agent brings about a widening of the interlayer spacing of the layer silicate, so that the layer silicate is able to take up monomers into the interlayer space. The subsequent polymerisation, polyaddition or polycondensation of the monomer or monomer mixture results in the formation of a composite material, a nanocomposite.

In the filler mixtures according to the invention it is preferable to use layer silicates that have been pre-treated with a polymerisable monomer prior to swelling. When the swelling is complete, the compositions are polymerised. Such monomers are, for example, acrylate monomers, methacrylate monomers, caprolactam, laurinlactam, aminoundecanoic acid, aminocaproic acid or aminododecanoic acid. The resin component or the hardener component of an epoxy resin system or the components of a polyurethane system can likewise be such monomers.

Suitable mineral fillers that can be used in the filler mixtures according to the invention are, for example, glass powder, glass beads, semi-metal and metal oxides, e.g. $SiO_2$ (aerosils, quartz, quartz powder, fused silica), corundum and titanium oxide, semi-metal and metal nitrides, e.g. silicon nitride, boron nitride and aluminium nitride, semi-metal and metal carbides (SiC), metal carbonates (dolomite, chalk, $CaCO_3$), metal sulfates (barite, gypsum), powdered minerals and natural or synthetic minerals primarily from the silicate series, e.g. talcum, mica, kaolin, wollastonite etc. It is also possible to use the untreated layer silicates that are used for the preparation of organophilic layer silicates.

Preferred mineral fillers are quartz powder, mica, kaolin, wollastonite, chalk and talcum.

The quantity ratio of the components can vary within wide limits according to the property profile desired in the filler mixtures according to the invention.

Preference is given to filler mixtures in which the proportion of organophilic layer silicate is from 1.0 to 60.0% by weight and the proportion of mineral filler is from 40.0 to 99.0% by weight.

In especially preferred filler mixtures, the proportion of organophilic layer silicate is from 2.0 to 50.0% by weight, especially from 4.0 to 30.0% by weight, and the proportion of mineral filler is from 50.0 to 98.0% by weight, especially from 70.0 to 96.0% by weight.

The filler mixtures according to the invention can be prepared prior to application in customary manner by mixing the components together using known mixing apparatus (e.g. stirrers, rollers).

It is also possible, however, to incorporate one of the components into the resin or into one of the resin components and then to add the other component prior to the polymerisation or curing.

As mentioned at the beginning, the filler mixtures according to the invention are suitable especially for the preparation of nanocomposites. The invention therefore relates also to a composition containing (A) from 20.0 to 99.5% by weight of a polymerisable or curable monomer or monomer mixture, and (B) from 0.5 to 80.0% by weight of a filler mixture comprising an organophilic layer silicate obtainable by treatment of a natural or synthetic layer silicate with a swelling agent selected from sulfonium, phosphonium and ammonium compounds (salts of melamine compounds and cyclic amidine compounds being excluded as ammonium compounds) and a mineral filler different therefrom.

Suitable as component A are monomers or monomer mixtures that can be polymerised to form solid thermoplastics or polycondensed or polyadded to form crosslinked thermosets, either by irradiation or heating, optionally in the presence of initiators.

Suitable components A are, for example, the monomers for the preparation of polyamides, vinyl polymers, polyesters, polyurethanes, polyphenylene sulfides, polyphenylene oxides, polyacetals, polycarbonates, polysulfones, polyether sulfones and rubber.

Monomers of polyamides are, for example, amino acids, such as 6-amino-n-caproic acid and 12-aminododecanoic acid, nylon salts, such as the adipic acid salt of hexamethylenediamine, and lactams, such as caprolactam, butyrolactam, caprylolactam and dodecanolactam.

Monomers of vinyl polymers are, for example, ethylene, propylene, butadiene, vinyl chloride, vinylidene chloride, styrene, acrylic acid, methacrylic acid, tert-butylacrylamide, acrylonitrile, norbornadiene, N-vinylcarbazole, vinylpyridine, N-vinyl-2-pyrrolidone, 1-butene, isobutene, vinylidene cyanide, 4-methylpent-1-ene, vinyl acetate, vinyl isobutyl ether, methyl vinyl ketone, phenyl vinyl ketone, phenyl vinyl sulfide and acrolein.

Further suitable components A are the monomers or oligomers that can be used for the preparation of thermosetting polymer systems.

Thermosetting polymer systems can be used in the form of polycondensates or polyadducts. Thermosetting plastics in the form of polycondensates are, for example, curable phenol/formaldehyde plastics (PF casting resins), curable bisphenol resins, curable urea/formaldehyde plastics (UF moulding materials), polyimides (PI), bismaleinimide moulding materials (BMI) and polybenzimidazoles (PBI). Thermosetting plastics in the form of polyadducts are, for example, epoxy resins (EP), moulding materials of unsaturated polyester resins (UP moulding materials), DAP resins (polydiallyl phthalate), melamine/formaldehyde resins, e.g. curable melamine/-phenol/formaldehyde moulding materials, and crosslinked polyurethanes (PUR).

Preference is given to epoxy resin systems, that is to say in the compositions according to the invention the component A is preferably composed of an epoxy resin having more than one 1,2-epoxy group in the molecule and a hardener for the epoxy resin.

Examples of Suitable Epoxy Resins are

I) Polyglycidyl and poly(β-methylglycidyl) esters, obtainable by reaction of a compound having at least two carboxyl groups in the molecule with epichlorohydrin and β-methyl-epichlorohydrin, respectively. The reaction is advantageously carried out in the presence of bases. Aliphatic polycarboxylic acids can be used as the compound having at least two carboxyl groups in the molecule. Examples of such polycarboxylic acids are oxalic acid, succinic acid, glutaric acid, adipic acid, pimelic acid, sebacic acid, suberic acid, azelaic acid and dimerised or trimerised linoleic acid. It is also possible, however, to use cycloaliphatic polycarboxylic acids, for example tetrahydrophthalic acid, 4-methyltetrahydrophthalic acid, hexahydrophthalic acid or 4-methylhexahydrophthalic acid. Aromatic polycarboxylic acids, for example phthalic acid, isophthalic acid or terephthalic acid, may also be used.

II) Polyglycidyl or poly(β-methylglycidyl) ethers, obtainable by reaction of a compound having at least two free alcoholic hydroxy groups and/or phenolic hydroxy groups with epichlorohydrin or β-methylepichlorohydrin under alkaline conditions, or in the presence of an acidic catalyst and subsequent alkali treatment. The glycidyl ethers of this kind may be derived, for example, from acyclic alcohols, such as from ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol and also from polyepichlorhydrins, but they may also be derived, for example, from cycloaliphatic alcohols, such as 1,4-cyclohexanedimethanol, bis(4-hydroxycyclohexyl)methane or 2,2-bis(4-hydroxycyclohexyl)propane, or they may have aromatic nuclei, such as N,N-bis(2-hydroxyethyl)aniline or p,p'-bis(2-hydroxyethylamino)diphenylmethane. The glycidyl ethers may also be derived from mononuclear phenols, for example from resorcinol or hydroquinone, or they may be based on polynuclear phenols, for example bis(4-hydroxyphenyl)methane, 4,4'-di-hydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane and also on novolaks, obtainable by condensation of aldehydes, such as formaldehyde, acetaldehyde, chloral or furfuraldehyde, with phenols, such as phenol, or with phenols substituted in the nucleus by chlorine atoms or $C_1$–$C_9$alkyl groups, for example 4-chlorophenol, 2-methylphenol or 4-tert-butylphenol, or by condensation with bisphenols, such as those of the kind mentioned above.

III) Poly(N-glycidyl) compounds, obtainable by dehydrochlorination of the reaction products of epichlorohydrin with amines that contain at least two amine hydrogen atoms. Such amines are, for example, aniline, n-butylamine, bis(4-aminophenyl)methane, m-xylylenediamine and bis(4-methylaminophenyl)methane. Poly(N-glycidyl) compounds also include, however, triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, derived from dithiols, for example ethane-1,2-dithiol or bis(4-mercaptomethylphenyl) ether.

V) Cycloaliphatic epoxy resins, for example bis(2,3-epoxycyclopentyl) ether, 2,3-epoxycyclo-pentylglycidyl ether, 1,2-bis(2,3-epoxycyclopentyloxy)ethane or 3,4-epoxycyclohexylmethyl 3',4'-epoxycyclohexanecarboxylate.

VI) Epoxy resins in which the 1,2-epoxy groups are bonded to different hetero atoms or functional groups, for example the N,N,O-triglycidyl derivative of 4-aminophenol, the glycidyl ether glycidyl ester of salicylic acid, N-glycidyl-N'-(2-glycidyloxypropyl)-5,5-dimethyhydantoin or 2-glycidyloxy-1,3-bis(5,5-dimethyl-1-glycidylhydantoin-3-yl)propane.

VII) Epoxidation products of unsaturated synthetic or natural oils or derivatives thereof; suitable natural oils are, for example, soybean oil, linseed oil, perilla oil, tung oil, oiticica oil, safflower oil, poppyseed oil, hemp oil, cottonseed oil, sunflower oil, rapeseed oil, walnut oil, beet oil, high oleic triglycerides, triglycerides from euphorbia plants, groundnut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, tall oil, palm oil, palm kernel oil, coconut oil, cashew oil and tallow oil and derivatives derived therefrom. Also suitable are higher unsaturated derivatives that can be obtained by subsequent dehydration reactions of those oils. Examples of suitable synthetic oils are polybutadiene oils, polyethylene oils, polypropylene oils, polypropylene oxide oils, polyethylene oxide oils and paraffin oils.

It is preferable to use as epoxy resin in the curable mixtures according to the invention a fluid or viscous polyglycidyl ether or ester, especially a fluid or viscous bisphenol diglycidyl ether.

Especially preferred are bisphenol diglycidyl ethers, especially bisphenol A diglycidyl ether and bisphenol F diglycidyl ether.

The above-mentioned epoxy compounds are known and some of them are commercially available. It is also possible to use mixtures of epoxy resins. For example, cured products having a high tensile strength and a high modulus of elasticity can be obtained when the epoxy resin used is a mixture of a bisphenol diglycidyl ether and an epoxidised oil or an epoxidised rubber.

Preferably such mixtures comprise bisphenol A diglycidyl ether and epoxidised soybean oil or linseed oil.

The amount of epoxidised oil or rubber is preferably from 0.5 to 30% by weight, especially from 1 to 20% by weight, based on the total amount of epoxy resin.

All customary hardeners for epoxides can be used; preferred hardeners are amines, carboxylic acids, carboxylic acid anhydrides and phenols. It is also possible to use catalytic hardeners, for example imidazoles. Such hardeners are described, for example, in H. Lee, K. Neville, Handbook of Epoxy Resins, McGraw Hill Book Company, 1982.

In a special embodiment of the invention the hardener is an amine, a carboxylic acid, a carboxylic acid anhydride or a phenol and additionally contains a maleinated oil, a maleinated rubber or an alkenyl succinate.

Using those specific hardener mixtures it is possible to obtain cured products having a high tensile strength and a high modulus of elasticity.

Suitable maleinated oils are, for example, the reaction products of the above-mentioned synthetic or natural oils or rubbers with maleic acid anhydride. An example of an alkenyl succinate is dodecenyl succinate.

The amount of maleinated oil or rubber or of alkenyl succinate is preferably from 0.5 to 30% by weight, more especially from 1 to 20% by weight, based on the total amount of hardener.

The amount of hardening agent used is governed by the chemical nature of the hardening agent and by the desired properties of the curable mixture and of the cured product. The maximum amount can readily be determined by a person skilled in the art. The preparation of the mixtures can be carried out in customary manner by mixing the components together by manual stirring or with the aid of known mixing apparatus, for example by means of stirrers, kneaders or rollers. Depending upon the application, conventionally used additives, for example fillers, pigments, colourings, flow agents or plasticisers, may be added to the mixtures.

Further preferred components A are polyurethane precursors. Structural components for crosslinked polyurethanes are polyisocyanates, polyols and optionally polyamines, in each case having two or more of the respective functional groups per molecule.

The invention therefore relates also to compositions comprising as component A a mixture of a polyisocyanate having at least two isocyanate groups and a polyol having at least two hydroxyl groups.

Aromatic and also aliphatic and cycloaliphatic polyisocyanates are suitable building blocks for polyurethane chemistry. Examples of frequently used polyisocyanates are 2,4- and 2,6-diisocyanatotoluene (TDI) and mixtures thereof, especially the mixture of 80% by weight 2,4-isomer and 20% by weight 2,6-isomer; 4,4'- and 2,4'- and 2,2'-methylenediisocyanate (MDI) and mixtures thereof and technical grades that, in addition to containing the above-mentioned simple forms having two aromatic nuclei, may also contain polynuclear forms (polymer MDI); naphthalene-1,5-diisocyanate (NDI); 4,4',4''-triisocyanatotriphenylmethane and 1,1-bis(3,5-diisocyanato-2-methyl)-1-phenylmethane; 1,6-hexamethylene diisocyanate (HDI) and 1-isocyanato-3-(isocyanatomethyl)-3,5,5-trimethylcyclohexane (isophorone diisocyanate, IDPI). Such basic types of polyisocyanates may optionally also have been modified by dimerisation or trimerisation with the formation of corresponding carbodiimides, uretdiones, biurets or allophanates.

Especially preferred polyisocyanates are the various methylene diisocyanates, hexamethylene diisocyanate and isophorone diisocyanate.

As polyols there may be used in the polyurethane production both low molecular weight compounds and oligomeric and polymeric polyhydroxyl compounds. Suitable low molecular weight polyols are, for example, glycols, glycerol, butanediol, trimethylolpropane, erythritol, pentaerythritol; pentitols, such as arabitol, adonitol or xylitol; hexitols, such as sorbitol, mannitol or dulcitol, various sugars, for example saccharose, or sugar and starch derivatives. Low molecular weight reaction products of polyhydroxyl compounds, such as those mentioned, with ethylene oxide and/or propylene oxide are also frequently used as polyurethane components, as well as the low molecular weight reaction products of other compounds that contain sufficient numbers of groups capable of reaction with ethylene oxide and/or propylene oxide, for example the corresponding reaction products of amines, such as especially ammonia, ethylenediamine, 1,4-diaminobenzene, 2,4-diaminotoluene, 2,4'-diaminodiphenylmethane, 4,4'-diaminodiphenylmethane, 1-methyl-3,5-diethyl-2,4-diaminobenzene and/or 1-methyl-3,5-diethyl-2,6-diaminobenzene. Further suitable polyamines are given in EP-A-0 265 781.

As long-chain polyol components there are used chiefly polyester polyols, including polylactones, for example polycaprolactones, and polyether polyols.

The polyester polyols are generally linear hydroxyl polyesters having molar masses of approximately from 1000 to 3000, preferably up to 2000.

Suitable polyether polyols preferably have a molecular weight of about from 300 to 8000 and can be obtained, for example, by reaction of a starter with alkylene oxides, for example with ethylene, propylene or butylene oxides or tetrahydrofuran (polyalkylene glycols). Starters that come into consideration are, for example, water, aliphatic, cycloaliphatic or aromatic polyhydroxyl compounds having generally 2, 3 or 4 hydroxyl groups, such as ethylene glycol, propylene glycol, butanediols, hexanediols, octanediols, dihydroxybenzenes or bisphenols, e.g. bisphenol A, trimethylolpropane or glycerol, or amines (see Ullmanns Encyclopädie der technischen Chemie, 4th edition, Vol. 19, Verlag Chemie GmbH, Weinheim 1980, pages 31–38 and pages 304, 305). Especially preferred kinds of polyalkylene glycols are polyether polyols based on ethylene oxide and polyether polyols based on propylene oxide, and also corresponding ethylene oxide/propylene oxide copolymers, it being possible for such polymers to be statistical or block copolymers. The ratio of ethylene oxide to propylene oxide in such copolymers may vary within wide limits. For example, only the terminal hydroxyl groups of the polyether polyols may have been reacted with ethylene oxide (end capping). The content of ethylene oxide units in the polyether polyols may also, however, have values of e.g. up to 75 or 80% by weight. It will frequently be advantageous for the polyether polyols to be at least end-capped with ethylene oxide, since in that case they will have terminal primary hydroxyl groups which are more reactive than the secondary hydroxyl groups originating from the reaction with propylene oxide. Special mention should also be made of polytetrahydrofurans which, like the polyalkylene glycols already mentioned above, are commercially available (trade name e.g. POLYMEG®). The preparation and properties of such polytetrahydrofurans are described in greater detail, for example, in Ullmanns Encyclopädie der technischen Chemie, 4th edition, Vol. 19, Verlag Chemie GmbH, Weinheim 1980, pages 297–299.

Also suitable as components of polyurethanes are polyether polyols that contain solid organic fillers in disperse distribution and chemically partially bonded to the polyether, such as polymer polyols and polyurea polyols. Polymer polyols are, as is known, polymer dispersions that can be prepared by free-radical polymerisation of suitable olefinic monomers, especially acrylonitrile or styrene or mixtures of the two, in a polyether serving as graft base. Polyurea polyols (PHD polyethers), which can be prepared by reaction of polyisocyanates with polyamines in the presence of polyether polyols, are dispersions of polyureas in polyether polyols, there likewise taking place a partially chemical linkage of the polyurea material to the polyether polyols by way of the hydroxyl groups on the polyether chains. Polyols such as those mentioned in this section are described in greater detail, for example, in Becker/Braun "Kunststoffhandbuch", Vol. 7 (Polyurethanes), 2nd edition, Carl Hanser Verlag, Munich, Vienna (1983), pages 76, 77.

Polyamines also play an important role as components in the preparation of polyurethanes, especially because they exhibit greater reactivity than comparable polyols. As in the case of the polyols, both low molecular weight polyamines, e.g. aliphatic or aromatic di- and polyamines, and polymeric polyamines, e.g. poly(oxyalkylene)polyamines, can be used.

Suitable poly(oxyalkylene)polyamines, which, for example, in accordance with U.S. Pat. No. 3,267,050 are obtainable from polyether polyols, preferably have a molecular weight of from 1000 to 4000 and are also commercially available, e.g. under the name JEFFAMINE®, such as JEFFAMINE® D2000, an amino-terminated polypropylene glycol of the general formula $H_2NCH(CH_3)CH_2$—$[OCH_2CH(CH_3)]_x$—$NH_2$, wherein x has on average the value 33, resulting in a total molecular weight of about 2000; JEFFAMINE® D2001 having the formula $H_2NCH(CH_3)CH_2$—$[OCH_2CH(CH_3)]_a$—$[OCH_2CH_2]_b$—$[OCH_2CH(CH_3)]_c$—$NH_2$, wherein b is on average about 40.5 and a+c is about 2.5; JEFFAMINE® BUD 2000, a urea-terminated polypropylene ether of formula $H_2N(CO)NH$—$CH(CH_3)CH_2$—$[OCH_2CH(CH_3)]_n$—$NH(CO)NH_2$, wherein n is on average about 33, resulting in a molecular weight of about 2075; or JEFFAMINE® T 3000, a glycerol-started poly(oxypropylene)triamine having a molecular weight of about 3000.

For the preparation of polyurethanes there are often used mixtures of one or more polyols and/or one or more polyamines, as described, for example, in EP-A-0 512 947, EP-A-0 581 739 or the prior art cited in those documents.

Various process variants can be employed for the preparation of the nanocomposites according to the invention:

the swelling agent can be inserted into the layer silicate by cation exchange and the resulting organophilic layer silicate can then be incorporated as part of the filler mixture together with the mineral filler into the resin mass or into one of the components of the resin mass.

It is also possible, however, firstly to adduct the swelling agent with a portion of the monomer or monomer mixture, insert the resulting product into the layer silicate and then process that mass with the remaining portion of the resin mixture and the mineral filler to form a moulding material.

The quantity ratio of components A and B in the compositions according to the invention may vary within wide limits. The proportion of component A is preferably from 30 to 95% by weight, more especially from 40 to 92% by weight, and the proportion of component B is preferably from 5 to 70% by weight, more especially from 8 to 60% by weight, based on the sum of components A and B.

In addition to components A and B, the compositions according to the invention may contain further customary additives, for example catalysts, stabilisers, propellants, parting agents, fireproofing agents, fillers and pigments, etc.

The invention relates also to a process for the preparation of a nanocomposite, wherein a composition comprising components A and B is solidified by curing or polymerisation of component A.

Special preference is given to nanocomposites that contain the layer silicate in exfoliated form.

By virtue of the very good property profile of the nanocomposites, the compositions according to the invention have a wide variety of uses, inter alia as coatings, paints/varnishes or adhesives.

The nanocomposites according to the invention can be processed by customary methods of plastics processing, such as injection moulding or extrusion, or other methods of shaping to form finished mouldings. Epoxy resins can be used as casting resins.

The present invention relates also to the use of the compositions according to the invention in the production of paints/varnishes, adhesives, casting resins, coatings, fireproofing agents, thixotropic agents or reinforcing agents.

The following Examples illustrate the invention.

EXAMPLE 1

Synthesis of 12-Aminododecanoic Acid Hydrochloride and the Three-layer Silicate Organophilically Modified Therewith 96.96 9 of 1 2-aminododecanoic acid are heated in 4 litres of deionised water in a glass beaker and, with stirring, 48 ml of concentrated hydrochloric acid are added. 200 g of the synthetic three-layer silicate Somasif ME 100 from CO-OP-Chemicals, Japan, are then added, with stirring, to the hot solution, a flocculent cream-coloured precipitate being formed. The precipitate is filtered off and washed with a total of 12 litres of hot deionised water, so that chloride can no longer be detected with 0.1N silver nitrate solution. The three-layer silicate so modified is dried at 80° C. for 72 hours in vacuo. The product is referred to as Somasif ADS below.

The degree of charge is ascertained by thermogravimetric tests at 78 meq./100 g. Somasif ME 100 has a cation exchange capacity of 70–80 meq./100 g. Measurement of the layer spacing of the three-layer silicate by means of X-ray tests reveals that it has increased from 0.94 nm to 1.6 nm.

EXAMPLES 2–9

Synthesis of the Filled Nanocomposites

For the preparation of the nanocomposites, a mixture of epoxy resin 1 (99.71 parts by weight of bisphenol A diglycidyl ether having an epoxy number of 5.00–5.25 eq./kg+ 0.29 parts by weight of tetramethylammonium chloride) and hardener 1 (Araldit® HY 925, methyltetrahydrophthalic acid anhydride) in a ratio by weight of 100:80 is selected. The mixture is modified with various amounts of the organophilic layer silicate prepared in Example 1 and various amounts of quartz powder Milisil W12. The production of the mouldings is described by way of example below using the example of a moulding material having 40% by weight quartz powder Milisil W12 and 10% by weight Somasif ADS.

In a tin container, 222.22 g of epoxy resin 1, 80 g of Somasif ADS and 320 g of quartz powder Milisil W12 are stirred in a planetary mixer for 1 hour at 80° C./13 mbar. 177.77 g of hardener 1 are then added. The reaction mixture is pregelled at 80° C./13 mbar, with stirring, to give a viscosity of about 20 000 mPas and then, for the production of mouldings, is introduced into steel moulds of dimensions 200×200×4 mm and fully cured at 140° C. for 14 hours.

The cast mouldings are milled to give test specimens, which are subjected to a tension test in accordance with ISO 527/95 and a bend-notch test according to PM/258/90. The mechanical properties obtained therefrom are listed in Table 1 below. It is will be seen that by incorporating the filler mixture Milisil W12/Somasif ADS, further reinforcement of the epoxy matrix can be achieved in comparison with quartz powder composites.

TABLE 1

| Example | 2 | 3 | 4 | 5 | 6 | 7 | 8 | 9 |
|---|---|---|---|---|---|---|---|---|
| epoxy resin 1 [g] | 266.7 | 233.3 | 200 | 166.7 | 133.3 | 166.7 | 166.7 | 166.7 |
| hardener 1 [g] | 213.3 | 186.7 | 160 | 133.3 | 106.7 | 133.3 | 133.3 | 133.3 |
| Somasif ADS [g] | 60 | 60 | 60 | 60 | 60 | 15 | 30 | 90 |
| Milisil W 12 [g] | 60 | 120 | 180 | 240 | 300 | 285 | 270 | 210 |
| total filler content | 20% | 30% | 40% | 50% | 60% | 50% | 50% | 50% |
| modulus of elasticity [MPa] | 5760 | 7100 | 8060 | 10800 | 12450 | 8870 | 9930 | 9890 |
| tensile strength [N/mm$^2$] | 20 | 35 | 44 | 30 | 32 | 77 | 76 | 20 |
| $K_{1C}$ [MPa · m$^{½}$] | 0.85 | 0.97 | 1.07 | 1.11 | 0.30 | 1.56 | 1.47 | 0.49 |
| $G_{1C}$ [J/m$^2$] | 114 | 123 | 129 | 96 | 7 | 252 | 199 | 25 |

EXAMPLES 10–14

Synthesis of Filled Nanocomposites Modified with Epoxidised Soybean Oil (Total Filler Content 50% by Weight, Content of Somasif ADS 10% by Weight)

For the preparation of these filler mixture moulding materials, 1; 2.5; 5; 10; 20% by weight of the epoxy component (epoxy resin 1) are replaced by epoxidised soybean oil (ESO). Again a ratio by weight of the epoxy component mixture (epoxy resin 1+epoxidised soybean oil) to anhydride hardener (hardener 1) of 100:80 is selected. Each of the mixtures is then filled with 50% by weight of the filler mixture (40% by weight Milisil W12 /10% by weight Somasif ADS). The preparation of such filler mixture moulding materials is described by way of example below using the example of the moulding material modified with 50% ESO.

In a tin container, 111.11 g of epoxy resin 1, 111.11 g of epoxidised soybean oil, 320 g of quartz powder Milisil W12 and 80 g of Somasif ADS are stirred for 1 hour at 80° C./13 mbar using a planetary mixer. 177.77 g of hardener 1 are then added. The reaction mixture is pregelled at 80° C./13 mbar, with stirring, to give a viscosity of about 20 000 mPas and then, for the production of mouldings, is introduced into steel moulds of dimensions 200×200×4 mm and fully cured at 140° C. for 14 hours.

The cast mouldings are milled to give test specimens, which are subjected to a tension test in accordance with ISO 527/95 and a bend-notch test according to PM/258/90. The mechanical properties obtained therefrom are listed in Table 2 below.

TABLE 2

| Example | 10 | 11 | 12 | 13 | 14 |
|---|---|---|---|---|---|
| epoxy resin 1 [g] | 220 | 216.7 | 211.2 | 200.2 | 178.2 |
| ESO [g] | 2.2 | 5.5 | 11.0 | 22.0 | 44.0 |
| hardener 1 [g] | 177.8 | 177.8 | 177.8 | 177.8 | 177.8 |
| Somasif ADS [g] | 80 | 80 | 80 | 80 | 80 |
| Milisil W12 [g] | 320 | 320 | 320 | 320 | 320 |
| modulus of elasticity [MPa] | 9090 | 8990 | 8860 | 8800 | 8520 |
| tensile strength [N/mm$^2$] | 60 | 61 | 59 | 59 | 55 |

It will clearly be seen that by incorporating epoxidised soybean oil, the tensile strengths of the filled nanocomposites can be increased without there being a substantial fall in the elasticity moduli.

EXAMPLES 17–22

Synthesis of Filled Nanocomposites Modified with n-Dodecenyl Succinate (Total Filler Content 50% by Weight, Content of Somasif ADS 10% by Weight)

For the preparation of these nanocomposites, 1; 2.5; 5; 10; 20; 50% by weight of the hardener component (hardener 1) are replaced by n-dodecenyl succinate (DDS). Again a ratio by weight of the epoxy component mixture (epoxy resin 1) to anhydride hardener mixture (hardener 1+n-dodecenyl succinate) of 100:80 is selected. Each of the mixtures is then filled with 50% by weight of the filler mixture (40% by weight Milisil W12/10% by weight Somasif ADS). The preparation of such filler mixture moulding materials is described by way of example below using the example of the moulding material modified with 50% DDS.

In a tin container, 222.2 g of epoxy resin 1, 320 g of quartz powder Milisil W12 and 80 g of Somasif ADS are stirred for 1 hour at 80° C./13 mbar using a planetary mixer. 88.9 g of hardener 1 and 88.9 g of DDS are then added. The reaction mixture is pregelled at 80° C./13 mbar, with stirring, to give a viscosity of about 20 000 mPas and then, for the production of mouldings, is introduced into steel moulds of dimensions 200×200×4 mm and fully cured at 140° C. for 14 hours.

The cast mouldings are milled to give test specimens, which are subjected to a tension test in accordance with ISO 527/95 and a bend-notch test according to PM/258/90. The mechanical properties obtained therefrom are listed in Table 3.

TABLE 3

| Example | 17 | 18 | 19 | 20 | 21 | 22 |
|---|---|---|---|---|---|---|
| epoxy resin 1 [g] | 222.2 | 222.2 | 222.2 | 222.2 | 222.2 | 222.2 |
| hardener 1 [g] | 176.0 | 173.3 | 168.9 | 160.0 | 142.2 | 88.9 |
| DDS [g] | 1.8 | 4.5 | 8.9 | 17.8 | 35.6 | 88.9 |
| Somasif ADS [g] | 80 | 80 | 80 | 80 | 80 | 80 |
| Milisil W12 [g] | 320 | 320 | 320 | 320 | 320 | 320 |
| modulus of elasticity [MPa] | 8940 | 9130 | 8830 | 8320 | 8540 | 7310 |
| tensile strength [N/mm$^2$] | 58 | 59 | 52 | 55 | 59 | 51 |

It will clearly be seen that by incorporating n-dodecenyl succinate, the tensile strengths of the filled nanocomposites can be increased without there being a substantial fall in the elasticity moduli.

What is claimed is:

1. A filler mixture comprising an (a) organophilic layer silicate obtainable by treatment of a natural or synthetic layer silicate with a swelling agent selected from the group consisting of sulfonium, phosphonium and ammonium compounds (salts of melamine compounds and cyclic amidine compounds being excluded as ammonium compounds); and (b) a mineral filler different from component (a).

2. A filler mixture according to claim 1, wherein the natural or synthetic layer silicate is selected from the group consisting of bentonite, vermiculite, halloysite, saponite, beidellite, nontronite, hectorite, sauconite, stevensite and montmorillonite.

3. A filler mixture according to claim 1, wherein the swelling agent is selected from the group consisting of salts of aminobutyric acid, 6-aminocaproic acid, ω-aminocaprylic acid, 10-aminodecanoic acid, 12-aminododecanoic acid, 14-aminotetradecanoic acid, 16-aminohexadecanoic acid and 18-aminooctadecanoic acid.

4. A filler mixture according to claim 1, wherein the natural or synthetic layer silicate has a layer spacing of about from 0.7 nm to 1.2 nm and a cation exchange capacity in the range of from 50 to 200 meq./100 g.

5. A filler mixture according to claim 1, wherein the layer silicate has been pretreated with a polymerisable monomer prior to swelling.

6. A filler mixture according to claim 1, wherein the mineral filler is quartz powder, mica, kaolin, wollastonite, chalk or talcum.

7. A filler mixture according to claim 1, wherein the proportion of organophilic layer silicate is from 1.0 to 60.0% by weight and the proportion of mineral filler is from 40.0 to 99.0% by weight.

8. A composition comprising
   (A) from 20.0 to 99.5% by weight of a polymerisable or curable monomer or monomer mixture, and
   (B) from 0.5 to 80.0% by weight of a filler mixture according to claim 1.

9. A composition according to claim 8, wherein component A is an epoxy resin selected from the group consisting of a fluid or viscous polyglycidyl ether, polyglycidyl ester, and a mixture of such compounds, and wherein component A further comprises a hardener.

10. A composition according to claim 9, wherein the epoxy resin is a bisphenol diglycidyl ether.

11. A composition according to claim 9, wherein the epoxy resin is a mixture of a bisphenol diglycidyl ether and an epoxidised oil or an epoxidised rubber.

12. A composition according to claim 9, wherein the hardener is an amine, a carboxylic acid, a carboxylic acid anhydride or a phenol.

13. A composition according to claim 12, wherein the hardener additionally contains a maleinated oil, a maleinated rubber or an alkenyl succinate.

14. A composition according to claim 8, wherein component A is a mixture of a polyisocyanate having at least two isocyanate groups and a polyol having at least two hydroxyl groups.

15. A process for the preparation of a nanocomposite, wherein a composition according to claim 8 is solidified by curing or polymerisation of component A.

16. A process comprising the production of a paint varnish, adhesives, casting resins, coatings, fireproofing agents, thixotropic agents or reinforcing agents from the composition of claim 8.

17. A filler mixture according to claim 5, wherein the polymerisable monomer is selected from the group consisting of acrylate monomers, methacrylate monomers, caprolactam, laurinlactam, aminoundecanoic acid, aminocaproic acid or aminododecanoic acid.

18. A filler mixture according to claim 7, wherein the proportion of organophilic layer silicate is from 2 to 50% by weight and the proportion of mineral filler is from 50 to 98% by weight.

19. A filler mixture according to claim 18, wherein the proportion of organophilic layer silicate is from 4 to 30% by weight and the proportion of mineral filler is from 70 to 96% by weight.

20. The composition of claim 8, wherein the proportion of component A is from 30 to 95% by weight and the proportion of component B is from 5 to 70% by weight.

21. The composition of claim 20, wherein the proportion of component A is from 40 to 92% by weight and the proportion of component B is from 8 to 60% by weight.

22. The composition according to claim 21, wherein the proportion of component B is 50% by weight.

* * * * *